United States Patent [19]

Cruzen et al.

[11] Patent Number: 4,494,287

[45] Date of Patent: Jan. 22, 1985

[54] METHOD OF MANUFACTURING A TURBINE ROTOR

[75] Inventors: Gerald S. Cruzen, Gregory; Said Izadi, Walled Lake; Peter Nagy, West Bloomfield, all of Mich.

[73] Assignee: Williams International Corporation, Walled Lake, Mich.

[21] Appl. No.: 466,166

[22] Filed: Feb. 14, 1983

[51] Int. Cl.³ .................... B21K 3/04; B23P 15/02; B23P 15/04
[52] U.S. Cl. .................. 29/156.8 R; 29/418; 29/423; 29/DIG. 4; 29/DIG. 5; 164/75; 164/76.1; 164/101; 228/118; 228/194; 416/213 R; 416/244 A
[58] Field of Search .............. 29/156.8 R, 156.8 CF, 29/423, 418, DIG. 4, DIG. 5; 164/108, 100, 101, 72, 74, 75, 76.1; 228/118, 194, 195; 416/213 R, 213 A, 244 A, 241 A

[56] References Cited

U.S. PATENT DOCUMENTS

| 1,470,505 | 10/1923 | Steenstrup | 29/156.8 R |
|---|---|---|---|
| 1,621,002 | 3/1927 | Dimberg | 29/156.8 R |
| 2,416,400 | 2/1947 | Mekl | 228/118 |
| 2,654,143 | 10/1953 | Hoesch et al. | 29/156.8 R |
| 2,983,992 | 5/1961 | Bloomberg | 29/156.8 R |
| 3,032,864 | 5/1962 | Webb | 29/156.8 B |
| 3,747,197 | 7/1973 | Riel | 228/118 |
| 4,008,052 | 2/1977 | Vishnevsky et al. | 228/193 X |
| 4,063,939 | 12/1977 | Weaver et al. | 29/156.8 R X |
| 4,096,120 | 6/1978 | Grunke | 29/156.8 R X |
| 4,096,615 | 6/1978 | Cross | 29/156.8 R |
| 4,152,816 | 5/1979 | Ewing et al. | 29/156,8 R |
| 4,270,256 | 6/1981 | Ewing | 228/193 X |
| 4,312,906 | 1/1982 | Arnold et al. | 228/118 X |

FOREIGN PATENT DOCUMENTS

| 2607684 | 10/1976 | Fed. Rep. of Germany | 164/100 |
|---|---|---|---|
| 68489 | 4/1983 | Japan | 228/194 |
| 2075891 | 11/1981 | United Kingdom | 228/118 |
| 198172 | 8/1967 | U.S.S.R. | 29/156.8 R |

Primary Examiner—Charlie T. Moon
Assistant Examiner—Ronald S. Wallace
Attorney, Agent, or Firm—Lyon, Lyman R.

[57] ABSTRACT

The disclosure relates to a process for the fabrication of low cost dual property turbine rotors having blades that are mechanically retained and a blade ring that is permanently bonded to a central hub.

3 Claims, 11 Drawing Figures

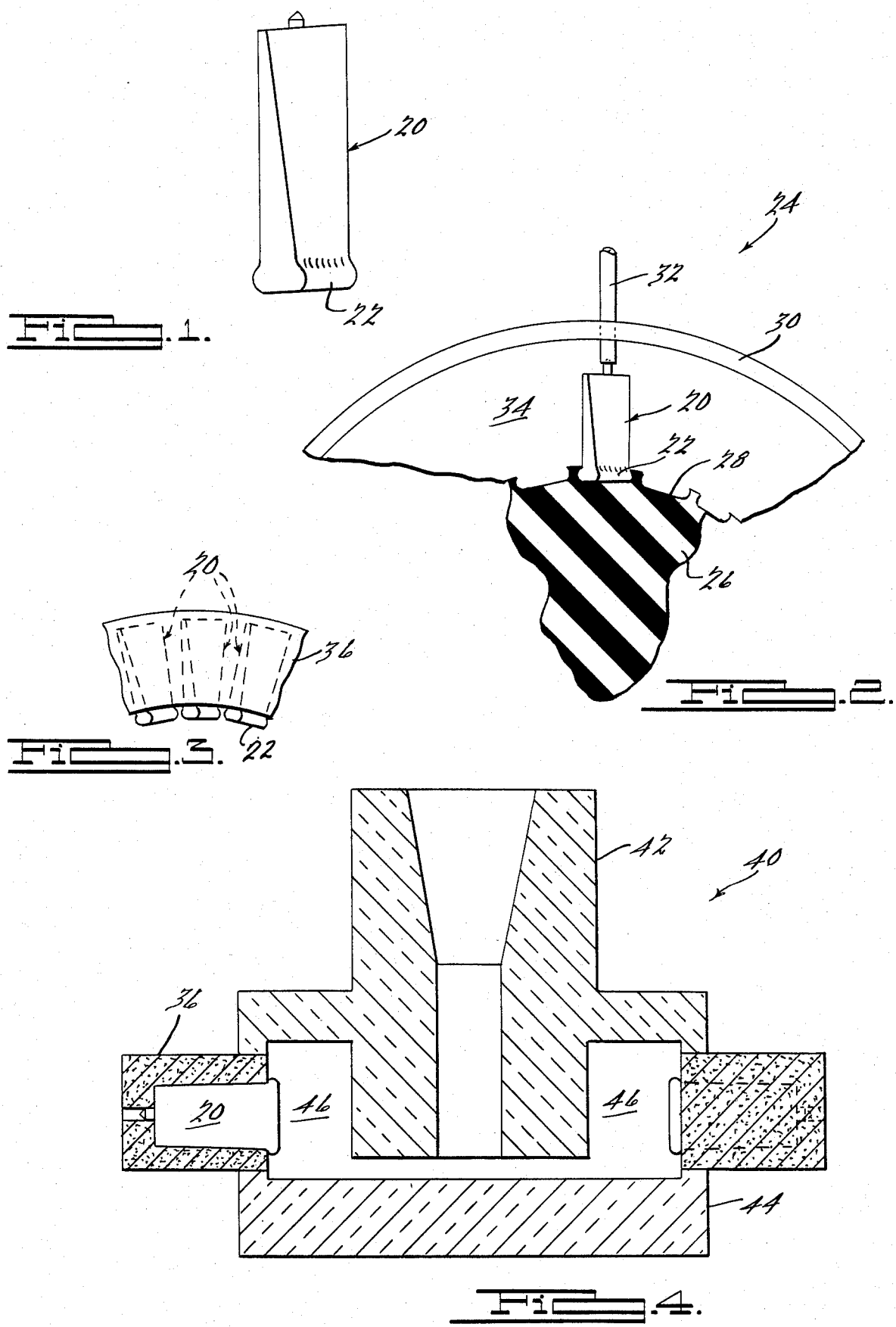

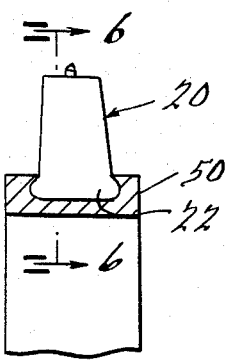
FIG. 5.
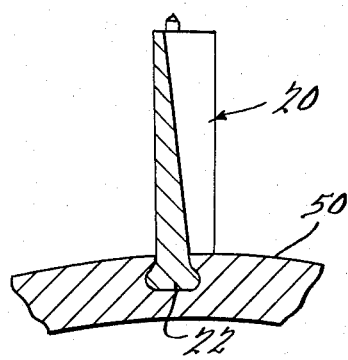
FIG. 6.
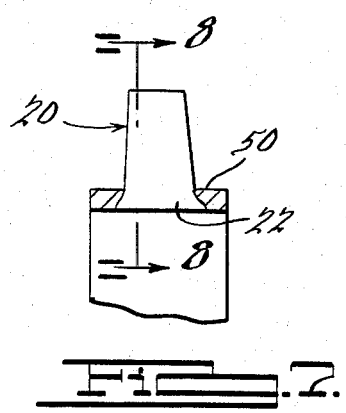
FIG. 7.
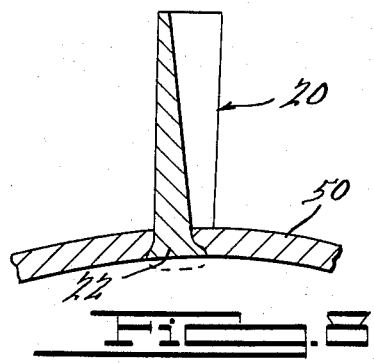
FIG. 8.
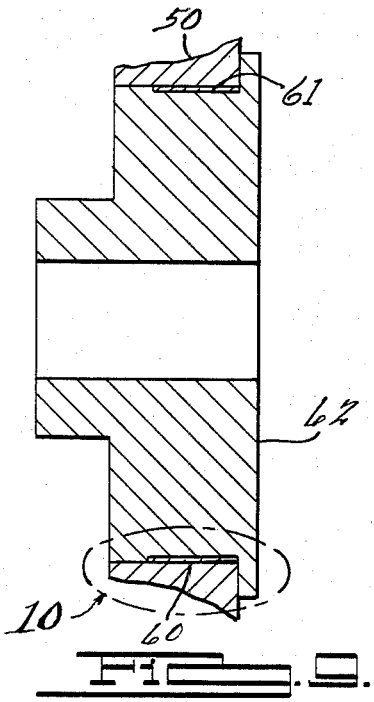
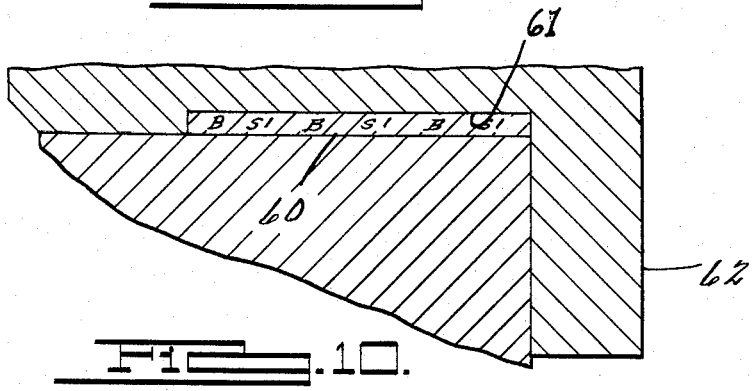
FIG. 10.
FIG. 9.
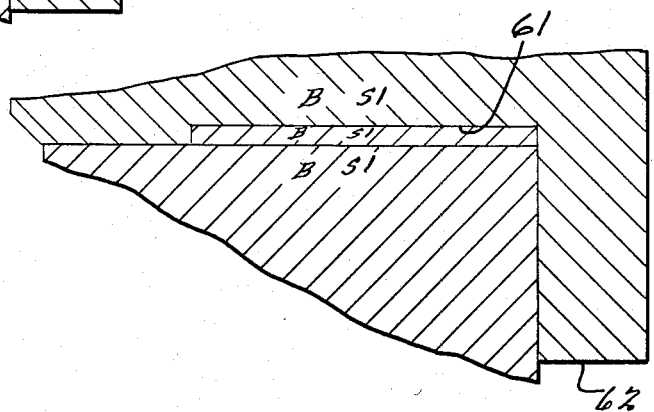
FIG. 11.

METHOD OF MANUFACTURING A TURBINE ROTOR

BACKGROUND OF THE INVENTION

One way to increase the power and fuel efficiency of a gas turbine engine is to increase the temperature of the combustion gases to the maximum level that the turbine and nozzle structures will withstand. The maximum turbine rotor inlet temperature allowed by current state-of-the-art uncooled metal turbine rotors is approximately 2050° F. Increasing the turbine rotor inlet temperature beyond 2050° F. requires the use of advanced super alloy blade materials which are generally not compatible with rotor disk mechanical property requirements.

A solution to this incompatibility problem is to adopt a dual-property approach to the fabrication of the turbine rotor. In large gas turbines, where size and complexity constraints are not acute, this is accomplished by using discrete blades of a high rupture strength material mechanically attached to a high burst strength disk. However, the physical size, cost, and complexity associated with this dual-property rotor concept have precluded its use in small, lightweight gas turbine engines.

SUMMARY OF THE INVENTION

The fabrication process of the instant invention makes it possible to produce relatively simple, low cost dual-property integral turbine rotors for use in small gas turbine engines. The rotors have discrete, high rupture strength blades permanently bonded to a high burst strength alloy hub. A means is provided for controlling bond penetration and geometry as well as blade vibration damping.

More specifically, individual turbine blades are fabricated; for example, from a single crystal alloy, oxide dispersion strengthened alloy, rapid solidification rate alloy, etc. Thereafter, the root and dovetail of each blade may be coated with a plasma sprayed ceramic material such as zirconium oxide or aluminum oxide. The zirconia and alumina materials provide control of the bond geometry by preventing diffusion. The material selection and coating thickness will determine the extent of metallurgical bonding and the blade vibration damping characteristics. The blades are placed in an assembly fixture and the annulus between the inner and outer rings is packed with resin sand or ceramic slurry. After hardening, the annular core is stripped from the fixture, leaving a free standing sand or ceramic core with exposed blade dovetails. The core and blade are placed in a rotor ring mold and the ring is cast about the blade dovetails. The inner diameter of the blade ring is machined to expose the roots of the blades.

The turbine disk is separately fabricated from, for example, powder metal (PM) alloy, an activating agent, for example, a foil or deposited layer consisting of a boron containing material being applied to the outer diameter of the hub thereof, after which the hub and blade ring are assembled by heating the blade ring and cooling the hub. The assembly is then diffusion bonded and subjected to a hot isostatic press cycle to complete the bond. After heat treat, the hub and blade tips are machined to final shape.

BRIEF DESCRIPTION OF THE DRAWINGS

FIG. 1 is a perspective view of a single tang dovetail turbine blade.
FIG. 2 is a view of a core ring assembly fixture.
FIG. 3 is a view of a completed core ring.
FIG. 4 is a view of a mold for casting a blade ring.
FIG. 5 is a view of a blade ring as cast.
FIG. 6 is a view taken along the line 6—6 of FIG. 5.
FIG. 7 is a view of the blade ring after machining of the I.D. thereof.
FIG. 8 is a view taken in the direction of the arrow 8 of FIG. 7.
FIG. 9 is a view of a turbine wheel hub.
FIG. 10 is a view taken within the circle 10 of FIG. 9 prior to heating of the assembly.
FIG. 11 is a view, similar to FIG. 10 after Boron and Silicon migration is complete.

DETAILED DESCRIPTION OF THE PREFERRED EMBODIMENT OF THE INVENTION

As seen in FIG. 1 of the drawings, a turbine blade 20 is fabricated from a high temperature material by known fabrication processes. Examples of such material could be single crystals of CMSX 2, MarM 247, or NASAIR 100. The blades 20 can also be directionally solidified eutectics (DSE), directionally solidified castings (DS), or mechanically strengthened alloys.

A dovetail root portion 22 of the blade 20 of FIG. 1 is coated by a plasma sprayed coating of zirconium oxide or aluminum oxide. The material selected for this coating, the coating thickness, and the method of coating are well known in the art. The coating is utilized to effect control of the extent of metallurgical bonding and blade vibration damping in the resulting article.

As seen in FIG. 2, a fixture 24 facilitates assembly of the blades 20 in a desired array and comprises an elastomeric inner form 26 having a plurality of grooves 28 to receive and envelope the coated roots 22 of the blades 20. An outer locating ring 30 holds positioning rods 32 which fix the turbine blades 20 securely in the slots 28 in the elastomeric form 26, leaving an open annulus 34.

After assembly of the aforesaid components, the annulus 34 is packed with prepared foundry sand or ceramic material and the assembly is baked. Thereafter, the positioning rods 32, outer ring 30 and inner elastomeric form 26 are removed. FIG. 3 illustrates the resulting sand or ceramic core ring 36 containing blades 20, the coated roots 22 of which are exposed.

As seen in FIG. 4, a rotor ring mold 40 comprises a ceramic cope 42 and a ceramic drag 44 which are assembled with the core ring 36 to define a mold cavity 46 in preparation for the bi-casting process which will result in a cast blade ring 50 for holding the coated blade dovetails 22 firmly in place but which is not metallurgically bonded to the blades 20. Bonding is prevented by the plasma sprayed coating on the blade dovetails.

As seen in FIGS. 5 and 6, the bi-cast blade ring 50 has the dovetails 22 of the blades 20 mechanically imbedded therein in a precise array. The outside diameter of the blades 20 and blade ring 50 is held within predetermined dimensional tolerances without additional machining. Examples of materials usable for the blade ring 50 are MarM 247, IN-100, IN-792, or other case superalloys.

As best seen in FIGS. 7 and 8, the radially inner surface of the blade ring 50 is machined to a depth sufficient to remove the ceramic dovetail coating and to expose the roots 22 of the blades 20 to condition the assembly for interaction with a layer of high temperature diffusion bond activator 60.

As seen in FIGS. 9–11, the particular diffusion bond activator 60 utilizes depends on the degree of interdiffusion desired, the character of the metallurgical bond desired, and the characteristics of the materials used for the blade ring 50 and a hub 62. Suitable diffusion bond activators are Ni-Cr-B-Si alloy containing 4.5% and 4% Si or elemental B-Si deposited by chemical or physical vapor deposition.

As seen in FIG. 9, a recess 61 is machined in the O.D. of the prepared hub 62 for the acceptance of the diffusion bond activator 60. The blade ring 50 is thereafter bonded metallurgically to the hub 62. The ceramic dovetail coating, which remains on the upper dovetail surfaces, prevents wicking of braze activator into the joint between the blade and blade ring. It is optional to apply the low-melting, bond activator 60 on the inside diameter of the blade ring 50, or where convenience favors, the outside diameter of the hub 62.

FIGS. 10 and 11 illustrate the phases of the process of metallurgically bonding the heat resistant blade ring 50 to the burst-resistant superalloy hub 62.

The three structural elements that coactivate in the bonding process are the blade ring 50 and superalloy hub 62, both of which have a melting point of approximately 2500° F., and the bond activator 60, which has a melting point of approximately 2000° F. When the aforesaid combination is heated at 2200° F. in a non-oxidizing, protective atmosphere, the superalloy hub/blade-ring combination is conditioned for diffusion bonding. The bond activator 60 (Ni-Cr-B-Si) melts, due to the fact that Boron has a relatively low melting point, and wets the outside diameter of the hub 62 and inside diameter of the ring 50. The plasma sprayed coating prevents wetting of the upper surfaces of the blade dovetail. As time progresses, Boron and Silicon migrate into the hub 62 and blade ring 50 in the solid state. Because Boron imparts the relatively low melting point to the bond activator 60, migration thereof raises the melting point of the bond activator 60 and lowers the melting point of the hub 62 and blade ring 50 until equilibrium is reached. Thus, because a constant temperature is maintained at about the equilibrium point of 2200° F., the entire assembly solidifies. After cooling, the completed rotor wheel is machined and conditioned for assembly with mating turbine engine components.

From the foregoing it should be apparent that, in accordance with the instant invention, blades may be made of a monolithic superalloy, single crystals, directionally solidified alloy or eutectic, metal matrix dispersion, fiber strengthened composite, monolithic ceramic, a composite fiber, or dispersion strengthened ceramic, as desired. A cast-on blade ring mechanically holds the blades in the position of end use, but is not metallurgically bonded thereto. However, provision is made for control of blade bond geometry and vibration damping by a buffered interface therebetween. A burst resistant hub of high strength superalloy is thereafter metallurgically bonded to the blade ring.

While the preferred embodiment of the invention has been disclosed, it should be appreciated that the invention is susceptible of modification without departing from the scope of the following claims.

We claim:
1. A method of making a turbine rotor comprising the steps of:
   A. arranging in a circular orientation a plurality of blades having dovetails on the root portions at the radially inner ends thereof on an inner circular blade support that envelopes said dovetails,
   B. filling the spaces between said blades outwardly of said root portions with a frangible material,
   C. removing said inner blade support from said blade dovetails,
   D. casting a metallic ring about said dovetails to fully encompass same,
   E. removing said frangible material from about said blades,
   F. machining the radially inner surface of said ring to expose a base of said root portions of said blades,
   G. providing a diffusion bonding material on at least the inner surface of said ring and exposed blades or the outer surface of said hub,
   H. assembling said ring and exposed blades on a central metallic hub, and
   I. heating the assembled blades, ring and hub to effect diffusion of said bonding materials into said ring, exposed blade and hub.

2. The method of claim 1 including the step of supporting the radially outer ends of said blades during the filling step B.

3. The method of claim 1 including the step of coating the dovetails of said blades with a vibration dampening and bond preventative material prior to casting said ring thereabout.

* * * * *